May 8, 1956   B. L. SNAVELY   2,745,083
TRANSDUCER, ELEMENTS THEREFOR, AND METHODS OF ASSEMBLY THEREOF
Filed July 7, 1949   5 Sheets-Sheet 1

Inventor
B. L. Snavely

By M. O. Hayes
Attorney

May 8, 1956 B. L. SNAVELY 2,745,083
TRANSDUCER, ELEMENTS THEREFOR, AND METHODS OF ASSEMBLY THEREOF
Filed July 7, 1949 5 Sheets-Sheet 4

Inventor
B. L. Snavely
Attorney

May 8, 1956  B. L. SNAVELY  2,745,083
TRANSDUCER, ELEMENTS THEREFOR, AND METHODS OF ASSEMBLY THEREOF
Filed July 7, 1949  5 Sheets-Sheet 5

Inventor
B. L. Snavely
By
M. O. Hayes
Attorney

United States Patent Office 2,745,083
Patented May 8, 1956

2,745,083

TRANSDUCER, ELEMENTS THEREFOR, AND METHODS OF ASSEMBLY THEREOF

Benjamin L. Snavely, Takoma Park, Md.

Application July 7, 1949, Serial No. 103,501

4 Claims. (Cl. 340—8)

(Granted under Title 35, U. S. Code (1952), sec. 266)

This invention relates to a transducer, to various elements thereof and to means and methods of assembling these elements. More particularly, this invention relates to a device for transducing static and dynamic mechanical energy into electrical signals having characteristics corresponding to the energy transduced. In one aspect, the invention relates to a transducer which is adapted for use under water. Such a device is termed a hydrophone, and will be so referred to in the description below.

The invention will be described particularly in terms of a transducer especially suitable for use as a hydrophone, and still more particularly in terms of a hydrophone of variable inductance especially suited to transducing sound energy of low frequency and for measuring static pressures, but it will be understood that many features of the invention will have utility in transducers of other types, and furthermore that some of the features of the invention will have general utility in other electrical devices.

In its broad aspects, the device of the present invention is similar to the hydrophone shown and described in the copending application of Joseph F. Keithley and Matthew L. Sands for Method and Apparatus for Measuring Transient Pressures in a Body of Water, Serial No. 480,576, filed March 25, 1943, now Patent #2,392,034, issued Jan. 1, 1946. The device described in this copending case is a transducer of the low frequency hydrophone type comprising a diaphragm on which an armature is mounted which moves with deflections of the diaphragm. Spaced from the armature at a predetermined distance is a core and coil arrangement comprising a pair of coils wound on the legs of a U-shaped core made of laminated magnetic material. The coils are connected in series and a source of alternating current is connected to their terminals. With variations of pressure on the exterior of the diaphragm, the diaphragm is deflected, moving the armature toward and away from the ends of the stationary core. This movement of the armature varies the reluctance of the magnetic circuit and consequently the inductance of the associated electrical circuit varies in accordance with the magnitude of the deflection of the diaphragm.

Variations in the inductance of the hydrophone are measured by a bridge and then analyzed, and if desired, recorded by suitable means fully described in the copending application above referred to, and also in the copending application of B. L. Snavely for Electrical Bridge Measuring Apparatus, Serial No. 12,843, filed March 3, 1948.

Although the device described in application Serial No. 480,576, in its broad aspects is of excellent design, it nevertheless suffers from several serious disadvantages. First of all, this prior art device lacks ruggedness and the ability to withstand rough handling. Ruggedness in construction is of particular importance in a device of this character since these devices are often handled by unskilled persons who are unaware of the delicacy of adjustment so necessary to continued accuracy of these instruments. In the second place, this prior art device is so designed that it is difficult to manufacture with the small tolerances that are required in devices of this nature. Because the manufacturing variations are large in the prior device, it is necessary to provide shims for adjusting the air gaps of the individual units to obtain satisfactory characteristics. Furthermore, this prior device lacks the ability to function effectively under wide and varied conditions of use and in particular, the ability to respond sensitively to low pressures and also effectively respond to very large pressures.

The present invention eliminates the disadvantages inherent in prior art hydrophones particularly of the type described in application Serial No. 480,576 above referred to. In accomplishing this objective, a transducer of the hydrophone type is provided which is extremely rugged and will withstand severe mechanical shocks. To provide this ruggedness of design, first of all, the most delicate element of the instrument, namely the core and coil assembly is mounted in a substantially shockproof manner by encasing it in a mass of plastic dielectric material which surrounds and supports it within a rigid supporting member at a fixed predetermined distance from the armature. This method of mounting the core and coil assembly, or other type of transducer element, while particularly desirable in an instrument of the hydrophone type which will be subjected to extremely rough use, will find general application in many other types of electrical instruments. To further increase the ruggedness of construction, the core and coil assembly are formed into a compact simple unit, the elements of which are extremely stable and rigidly held in fixed spatial relationship with respect to one another. At the same time the entire magnetic unit, comprising a core and coil assembly and a movable armature, is so constructed that it possesses the highest magnetic efficiency.

In order to eliminate the difficulties in the manufacture of the prior device and to provide a device having extremely small manufacturing tolerances, new methods and means of assembly and construction have been devised, which will not only find application in the hydrophone described particularly below but which will also find general application in the construction of other types of transducers and in other kinds of electrical instruments. In particular, new methods and means for accurately establishing the air gap between the movable armature and the core and coil assembly have been provided. As will be apparent from the description below, the new type of construction of the magnetic unit comprising the armature and the core and coil assembly enables the hydrophone to be quickly and accurately assembled.

In order to broaden the range of utility of the hydrophone units without necessity of adjustment, means have been provided for varying the sensitivity of the hydrophone in accordance with increasing intensity of sound or pressure energy to which the hydrophone is subjected. The hydrophone of this invention responds sensitively to low pressures and to sound energy of comparatively low intensity and also faithfully records pressures and sound energy of enormously increased intensity. Generally, the means which is described hereinafter for varying the sensitivity comprises an element operatively associated with the diaphragm of the hydrophone which coacts with the diaphragm to progressively decrease its effective vibrating area as the static or dynamic pressure on the diaphragm progressively increases. This means not only has utility in a transducer of the hydrophone type, comprising a variable inductance, but will find utility in many other types of transducers which must transduce energies of widely varying intensity.

Thus, it is an object of the invention to provide a transducer which is of a rugged and shock-resistant construction, and in which the most delicate elements are insulated from mechanical shock due to rough handling, and in which the various elements are rigidly held in a fixed predetermined spaced relation with one another. In this connection it is a further object of the invention to provide methods and means of general application for mounting sensitive electrical units which must be protected from shock and at the same time maintained in a fixed spatial relationship with associated elements.

It is a further object of the invention to provide methods and means for constructing a transducer particularly of the hydrophone type, which will result in small manufacturing tolerances especially in establishment of the air gap between the armature and the core and coil assembly.

It is still another object of the invention to provide means applicable to transducers of all types but particularly suitable for the variable inductance type, for decreasing the sensitivity of the transducer in accordance with increasing intensity of sound or pressure energy impinging on the diaphragm of the transducer. In particular, it is an object of the invention to provide a hydrophone which will withstand very large pressures such as those produced by explosions or occurring at great depths of submergence and will also have a high sensitivity for small pressure changes.

Still another object of the invention is to provide an electro-magnetic assembly which is compact and mechanically rugged and at the same time possesses a high magnetic efficiency. In particular it is an object of the invention to construct the magnetic components of an assembly of variable inductance so that these components will be compact and mechanically rugged and yet function in a highly efficient manner.

Other objects and many of the attending advantages of this invention will be readily appreciated and the same become better understood by reference to the following detailed description when considered in connection with the accompanying drawings wherein.

Figure 1:
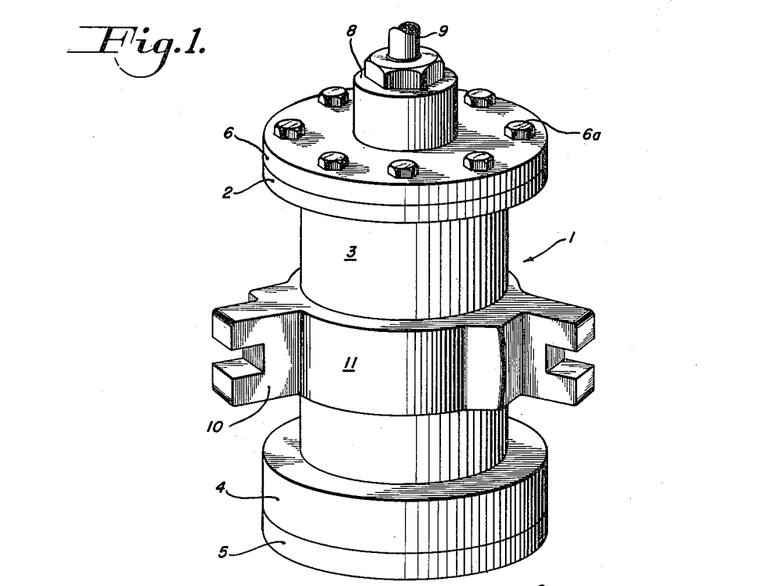
Fig. 1 is a perspective view of one embodiment of the invention which is adapted for use within a moderate range of operating conditions.
Figure 2:
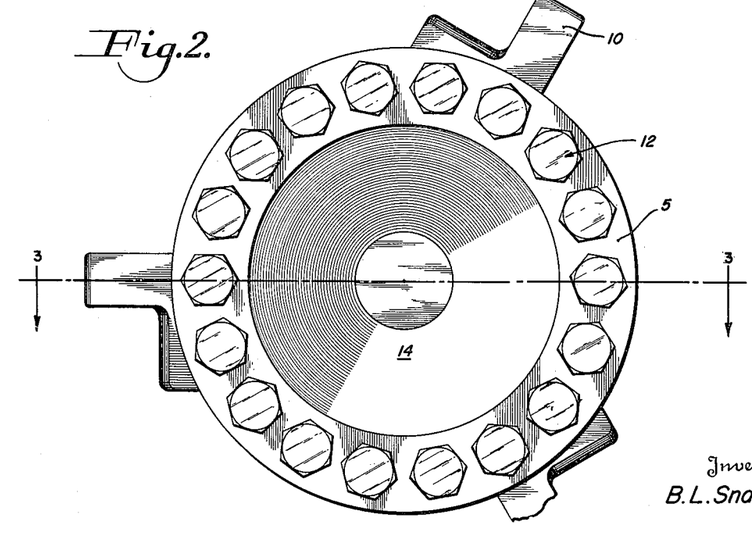
Fig. 2 is a plan view of the front end of the embodiment shown in Fig. 1 and somewhat enlarged.
Figure 3:
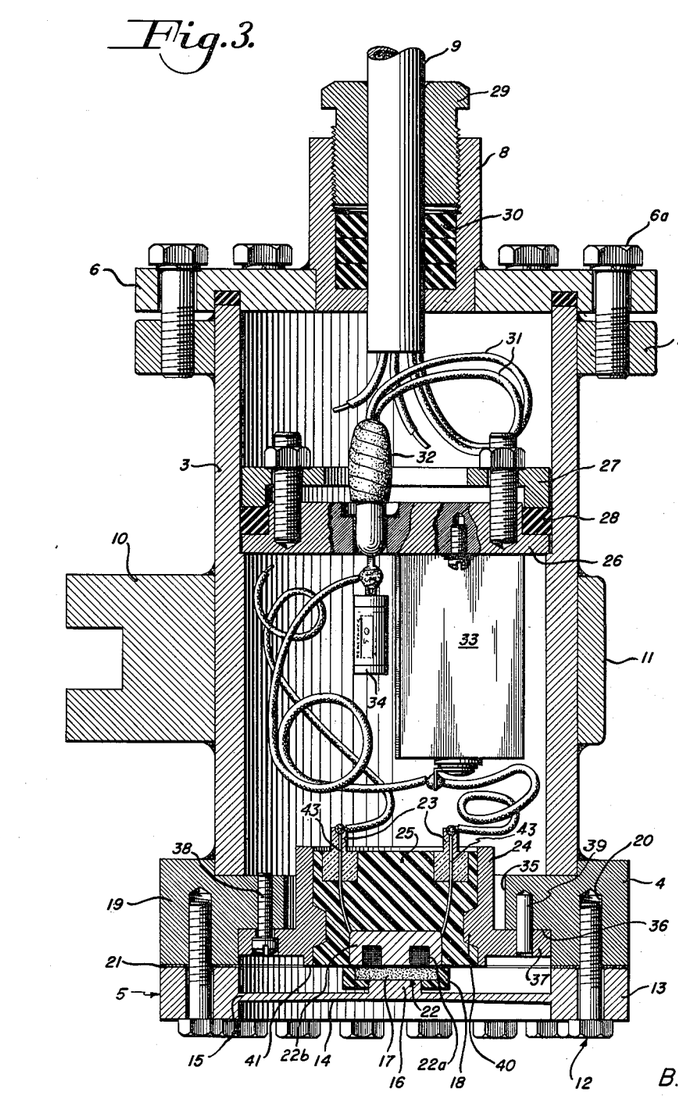
Fig. 3 is a section on the line 3—3 of Fig. 2.

The embodiment shown in Figs. 1 to 3 is a hydrophone designed for use under a moderate range of operating conditions. This hydrophone possesses all the advantages of the present invention except that it is not provided with means for varying its sensitivity in accordance with increasing pressure or increasing intensity of energy impinging upon the diaphragm. However, it is admirably suited for measuring pressures from zero to 1,000 pounds per square inch for example, or for responding to sound energy of moderate intensity.

Referring now to Fig. 1, the numeral 1 refers generally to hydrophone constructed in accordance with the invention. The numeral 2 refers to a circular flange welded to the rear portion of the cylindrical casing 3. The numeral 4 refers to a circular plate welded to the front of casing 3, which also serves as a backing member for supporting a circular diaphragm 5 which is bolted to plate 4 at the outer periphery thereof. A circular closure plate 6 is secured to the rear flange 2 by means of bolts 6a. A boss 8 is welded or otherwise affixed to the plate 6 at the center thereof. An electric cable 9 is led into the casing 3 through a packing gland formed in the boss 8. Bifurcated lugs 10 are provided equally spaced about the outer circumference of casing 3. Lugs 10 and the associated reinforcing web 11 are preferably cast integrally with casing 3. Suitable rig (not shown) may be provided to couple the hydrophone to a suitable apparatus for raising and lowering or otherwise handling the hydrophone.

As can be seen in Fig. 2, diaphragm 5 is bolted to flange 4 by a plurality of bolts 12 provided around the outer periphery of the diaphragm.

Referring now to Fig. 3, it will be seen that the diaphragm 5 is made up of an annular section 13 which is thicker than the central portion 14 and which supports the diaphragm on the flat outer sealing surface of the backing plate 4. The central vibrating portion 14 of the diaphragm is slightly thickened at its outer edges as at 15 in order to prevent the central portion 14 from breaking away from the thick supporting annulus 13 when the diaphragm is subjected to very large deflections. A boss 16 is formed on the interior face of the diaphragm at the central portion thereof. Cemented to this boss is a disc-shaped armature 17 which is composed of finely divided discrete particles of highly permeable magnetic material preferably of the type known in the trade as Permalloy. The finely divided particles of permeable magnetic material are bound together in a unitary mass by a resinous dielectric material which insulates the individual particles from each other and at the same time serves as a binding medium therefor. To guard the rather fragile edges of the armature 17, a suitable guard ring 18 is provided, composed for example of a Bakelite resin.

The backing plate 4 which supports the diaphragm is provided with a heavy annular portion 19, the outer surface of which is ground flat and adapted to support in water tight relationship the flat annular portion 13 of the diaphragm 5. Interiorly threaded bores 20 are provided around the annulus 19 to receive the bolts 12 clamping the diaphragm to the backing plate. A metal gasket 21 between the sealing surfaces of the diaphragm and the backing plate provides a water-tight seal, and at the same time spaces the armature 17 and a core and coil assembly (generally indicated by 22) a predetermined distance from each other. The core and coil assembly, together with terminals 23, is securely supported by the backing plate 4 through the medium of a hollow cylindrical member 24 and a mass of molded plastic dielectric material 25. The assembly of the core and coil within its supporting elements forms an important feature of the invention. The various details of this assembly and the method of forming the assembly in such a manner that the core and coil assembly is fixed within its supporting members in an accurately located predetermined position will be described in detail below.

Intermediate of backing plate 4 and rear closure plate 6, a bulkhead plate 26 is provided which divides the interior of the hydrophone case into two water-tight compartments, thereby protecting the electrical components in the front compartment from damage in case water enters the hydrophone through the cable 9 and the gaskets surrounding it. An annular ring 27 is bolted to the bulkhead plate 26 and serves to compress a gasket 28 seated in an annular groove in the bulkhead plate. The bulkhead and the case are rigidly fixed with respect to each other by the frictional forces developed between them by the rubber gasket 28 which also seals the space between the case and the bulkhead. As explained, the cable 9 enters the rear of the casing through a boss 8 provided on the rear closure plate 6. A gland nut 29 compresses packing material 30 which forms a water-tight seal between the cable and the casing. Electrical leads 31 are led into the casing through the cable 9 and are carried through the bulkhead by means of glass insulated seals 32 of commercial design, which are sweated to the bulkhead. A condenser 33 is bolted to the bulkhead plate 26 and is connected in series with the coil 22a. A resistor 34 is connected in shunt with the output of the series condenser and coil.

Referring now more particularly to the coil and core 22 and to the manner of its assembly within its supporting elements, it will be seen that the backing plate 4 is provided with a centrally located aperture 35. A shoulder 36 is formed within the aperture 35, and a hollow cylindrical auxiliary supporting member 24 is provided with a flange 37 which is seated on and supported by shoulder 36. Bolts 38 secure cylindrical member 24 to the backing plate 4. A pin 39, fixed to the backing plate, passes through a hole in the flange 37 and serves to locate the core and coil in a predetermined angular position within its supporting elements. The core and coil and the terminals 23 are supported in and surrounded by a mass of molded plastic dielectric material 25 which rigidly supports the core and coil assembly within the cylindrical member 24 and insulates it from its surrounding metallic supporting members. Preferably an annular rib 40 is formed within the cylindrical member 24 to more effectively anchor the plastic material 25.

Figure 9:
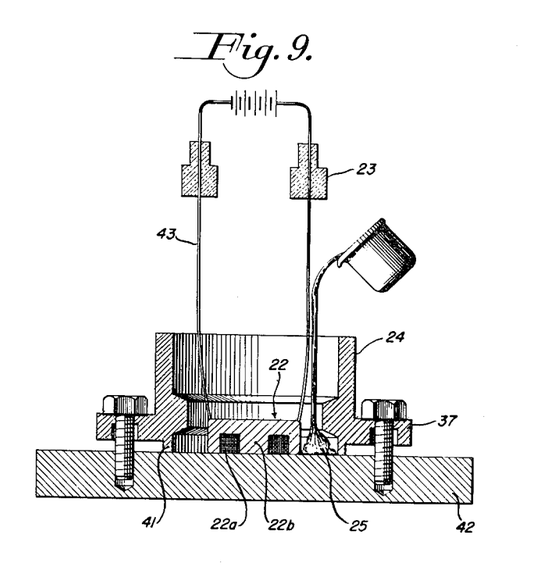
Fig. 9 is a view illustrating the method of assembling the core and coil in its supporting members.

The method of manufacturing this assembly will now be described and may be understood more readily by reference to Fig. 9. First of all, the flat peripheral sealing surfaces of the diaphragm and the outer face of the armature 17 are simultaneously ground flat and coplanar with one another. Next, the hollow cylindrical member 24 is bolted in place on the backing plate and the sealing surfaces of the backing plate and the circular lip 41 of the cylindrical member 24 are simultaneously ground flat and so as to be coplanar. The cylindrical member 24 is then removed from the backing plate and clamped to a flat steel plate 42 with the circular lip 41 held securely in contact with the surface of the steel plate. Conveniently, bolts passing through the holes provided in flange 37 may be utilized to clamp the member 24 to flat steel plate 42. Following this, the core and coil assembly 22 including core 22b which has its face ground perfectly flat is positioned within the cylindrical member 24 in face adjacency with the surface of the steel plate as shown in Fig. 9, and precisely centered therein by means of a jig (not shown). A current of one or two amperes is then passed through the coil 22a through leads 43, thus effectively anchoring the core and coil in a fixed relation to the cylindrical member 24 by means of magnetic traction. Following this, the jig is removed and a suitable liquid dielectric material of a character providing dimensional stability after hardening is cast around the core and coil filling the interior of the cylindrical member 24. Before the dielectric material hardens, terminals 23 are embedded in its surface. A satisfactory dielectric material for casting around the coil and core assembly is a plaster of paris composition having resinous strengthening binder. This casting composition has been found to have excellent dielectric properties and also to provide a mechanically rugged and shock proof support for the core and coil assembly which thereafter maintains a constant position of this assembly in the cylindrical member. It will be readily apparent that, when the dielectric mass 25 has hardened and the cylindrical member 24 is removed from the supporting surface 42, the outer surfaces of the core 22b will be coplanar with the circular lip 41. When this assembly is bolted in place on the backing plate, the peripheral sealing surfaces of the backing plate, the circular lip 41, and the outer surfaces of the core 22b will all lie in the same plane. Since the sealing surfaces of the diaphragm and the outer face of the armature also lie in the same plane, if the diaphragm were assembled on the backing plate without a gasket therebetween, the outer face of the armture would directly abut the outer face of the core 22b. An air gap of any desired size between the face of the armature and the face of the core may be established by inserting a gasket of proper thickness between the sealing surfaces of the diaphragm and the backing plate. The characteristics and efficiency of the transducer of the invention depend very heavily on the accuracy with which the air gap between the armature and the core is established. The construction described above permits this air gap to be established of any predetermined size depending on the choice of the thickness of the gasket, and with an accuracy limited only by the accuracy with which the coplanar surfaces are ground.

The advantages of the above described method and means for mounting a core and coil within its supporting members are many. The cast dielectric material 25 which encases the coil and core assembly prevents any displacement of the core and coil with reference to the armature or its surrounding supporting members. The core and coil is held in strict coplanar relationship with the sealing surfaces of the backing plate and therefore is held strictly parallel to the armature. The dielectric material in addition prevents the flow of eddy current which might be set up in the surrounding metallic supporting elements. The method described above for establishing a fixed spatial relationship between the core and coil assembly and the cylindrical supporting member 24 is an important feature of the invention. In a simple and rapid manner the core and coil is accurately centered within the member 24 and the outer surface of the core aligned in perfect coplanar relationship with the annular lip 41. While the dielectric composition 25 is cast or otherwise formed around the core and coil and within the cylindrical member 24 the core and coil is rigidly held in this predetermined position by means of magnetic traction. Thus there is no possibility of displacement of the core and coil assembly while plastic material is formed around it. The foregoing construction and method of assembly of the core and coil element within its supporting members may obviously be applied to the construction and assembly of any desired type of transducer element where high accuracy and ruggedness of construction are particularly desirable.

Figure 7:
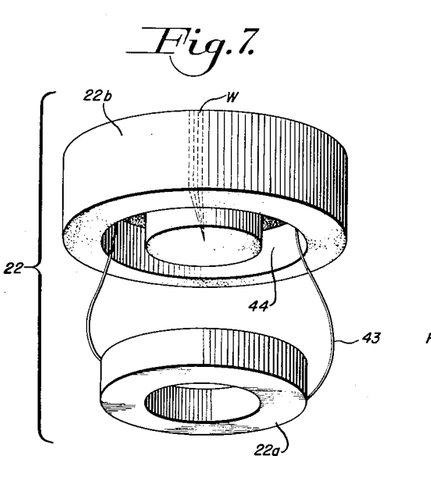
Fig. 7 is an exploded perspective view of the core and coil assembly of the invention.
Figure 8:
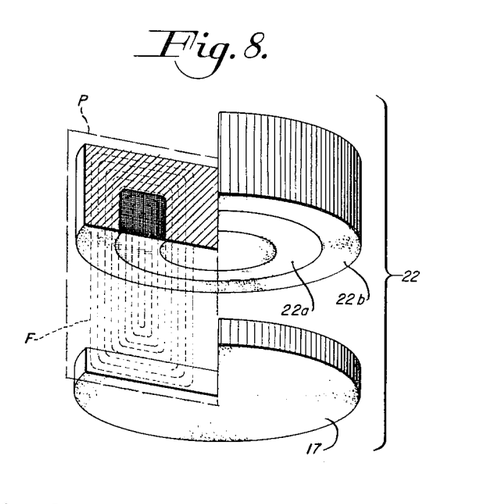
Fig. 8 is a diagrammatic illustration of the magnetic characteristics of core and coil assembly shown in Fig. 7.

Referring now to Figs. 7 and 8 which show in detail the construction and operation of the core and coil assembly of the invention, the core 22b comprises a disc made up of finely divided discrete particles of magnetic powder consolidated by and insulated from one another by a suitable dielectric binder. An annular cavity 44 is formed in the outer surface of the core. As heretofore explained, the outer surface of the core is ground perfectly flat. A circular coil 22a fits into the annular cavity 44 and is sealed therein with a suitable dielectric sealant. Leads 43 from the coil may be led out through suitable apertures formed in the core. Fig. 8 diagrammatically illustrates the manner in which the core and coil assembly shown in Fig. 7 cooperates with the armature 17 also constructed of discrete particles of powdered magnetic material bound together and insulated from one another by a mass of dielectric material, to form an efficient magnetic unit. In the arrangement shown in Fig. 8, the lines of flux F will flow through the core and the armature in planes P perpendicular and radial with respect to the cylinder defined by the disc-shaped core and coil assembly and the armature.

In the construction of magnetic cores and armatures, it is well known that the lines of flux must flow parallel to thin veins of magnetic material which are insulated from each other in order to avoid setting up eddy currents within the magnetic material which would reduce the magnetic efficiency of the system. Thus the use of magnetic cores made up of a number of thin laminations of magnetic material insulated from one another is common and well known. In the hydrophone described in application 480,576 above referred to, the armature is constructed of a number of thin laminations of Permalloy, the laminations comprising thin strips of Permalloy running parallel to one another in planes perpendicular to the flat surfaces of the disc-shaped armature. In this same device, the U-shaped magnetic core opposite the armature is also composed of a number of thin laminations of Permalloy. In assembly, the diaphragm must be angularly positioned so that the laminations of the armature extend in parallel relationship with the laminations of the core. Otherwise the lines of flux arising from the core, instead of flowing through magnetic veins parallel to those in the core would cut across the magnetic veins of the armature and thus set up eddy currents therein. It has been found that by constructing the armature out of a powdered magnetic material such as Permalloy powder, the particles of which are bound together and insulated from one another by a dielectric binder, the necessity for establishing a precise angular relationship between the armature and the core is obviated. Thus, the likelihood of errors in the assembly of the apparatus is eliminated. Since the armature is composed of very fine discreet particles of magnetic material each insulated one from the other, the lines of flux may choose their own path through the armature without setting up eddy curents.

The core 22b is likewise composed of powdered magnetic material consolidated by a dielectric binder. The advantages of magnetic efficiency and the prevention of eddy currents described above in relation to the armature apply in like manner to the core. The design of the core and coil assembly illustrated in Figs. 7 and 8 is extremely desirable because of its compactness, simplicity and ruggedness of construction. The core itself is of unitary construction, being fashioned from a compressed disc of powdered material by machining an annular cavity in one surface thereof. Only one coil unit is necessary and this may be securely sealed within the annular cavity without any possibility of relative movement between it and the core. Such a compact, simple and rugged construction would not be possible with the use of the conventional laminated cores. In order for a core of this design constructed of laminated material to have the required magnetic efficiency, the laminations would have to consist of a great number of wedge-shaped laminations W, since, as explained above, the lines of flux flow in radial perpendicular planes through the core and the armature. This type of laminated construction, of course, would be very expensive to manufacture and would only approach the magnetic efficiency of a core constructed of discrete particles of powdered magnetic material bound together and insulated from one another by a dielectric material, although both forms have radially extending areas providing highly permeable paths for magnetic flux and high resistance to eddy currents.

Figure 4:
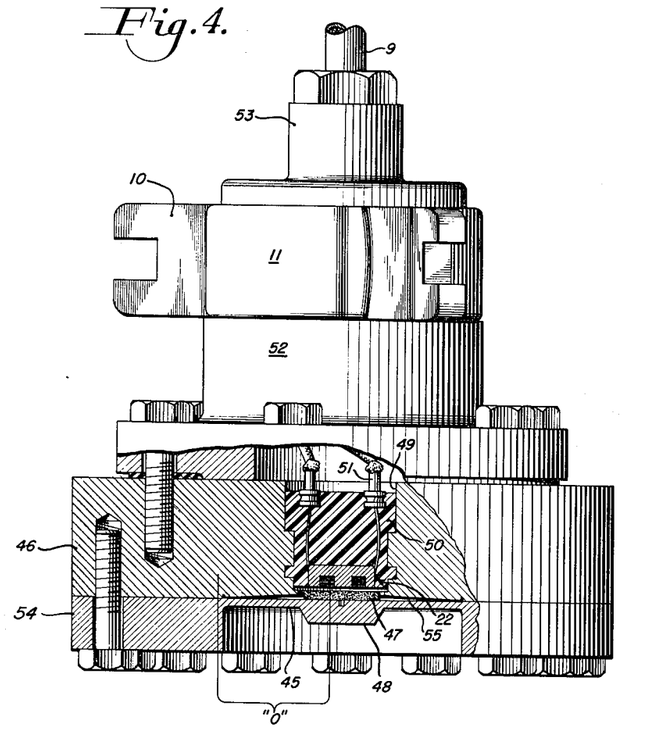
Fig. 4 is a center section of another embodiment of the invention which is provided with means for varying its sensitivity in accordance with increasing pressure or intensity of sound energy, and is therefore adapted for use under a wide range of operating conditions.
Figure 5:
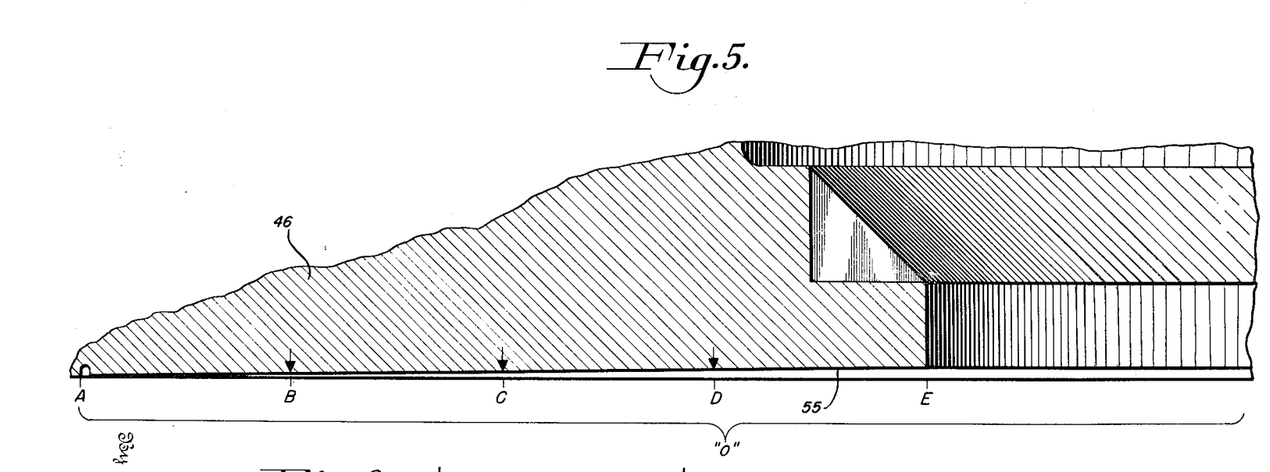
Fig. 5 is a view showing the details of the sloping surface of the backing plate which provides the automatically varying sensitivity of the instrument shown in Fig. 4.
Figure 6:
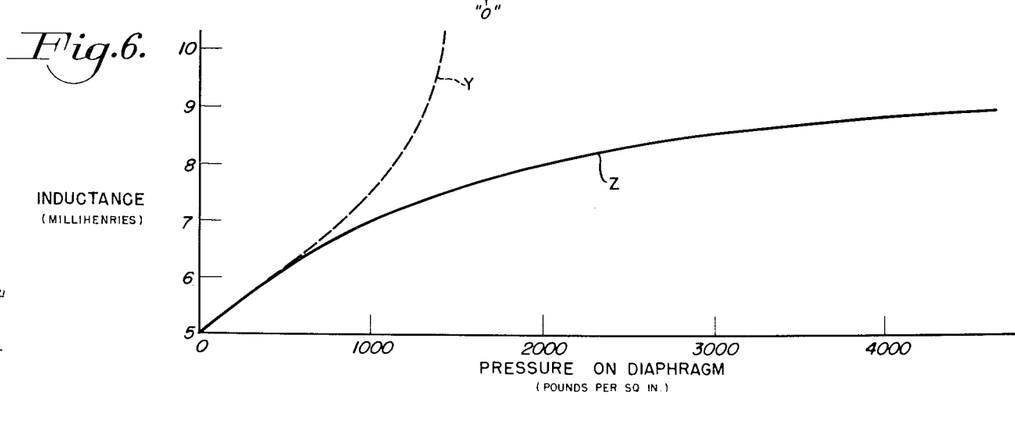
Fig. 6 is a graph illustrating the manner in which the sensitivity of the hydrophone shown in Fig. 4 varies under varying conditions of use.

Referring now to Figs. 4 to 6, the hydrophone shown in these figures is of the type designed to have a wide range of utility under widely varying conditions of use by the provision of means which decrease the sensitivity of the instrument in accordance with increasing intensity of sound energy impinging on the diaphragm or in accordance with increasing static pressure to which it is subjected. Unless the sensitivity of the hydrophone is decreased with increasing pressure or intensity of sound energy it would be unable to respond effectively to large pressures or sound energy of great intensity without adjusting the air gap between the armature and the face of the core or by increasing the thickness of the diaphragm to increase its stiffness. The hydrophone of this embodiment will react sensitively to sound intensity of low values, and without the necessity of adjustment, will respond effectively to sound energy of enormously increased intensity. For instance the hydrophone shown in Figs. 4 to 6 will respond to the low amplitude waves created by a seismic disturbance and at the same time will respond to and detect sound energy of enormous amplitude created by an under water atomic explosion.

The hydrophone shown in Fig. 4 is provided with a diaphragm 45 having a thick peripheral portion 54 which is bolted to the flat peripheral portion of backing plate 46. An armature 47, similar in all respects to the armature 17 described above, is affixed to the center of the perfectly flat interior face of the diaphragm. The outer surface of the diaphragm, opposite the armature 47 is thickened as at 48. When the diaphragm is subjected to extreme deflections the thickened center portion of the diaphragm will tend to remain flat, and this will prevent stresses between the armature and the diaphragm which might break them apart.

The backing plate 46 is provided with a centrally located aperture 49 in which a coil and core assembly 22, similar in all respects to that described above, is rigidly fixed by a mass of molded plastic dielectric material 50 which supports the core and coil assembly and the terminals 51 in the same manner as the plastic dielectric material 25 described above. The core and coil assembly 22 is directly opposite the armature and is spaced therefrom by an air gap of predetermined size. The method of mounting the core and coil assembly within the supporting backing plate is similar to the method described in connection with the hydrophone described above. However, it will be noted that the face of the core and coil is not coplanar with the peripheral sealing surfaces of the backing plate as is the case with the hydrophone shown in Figs. 1 to 3. Furthermore, there is no gasket between the backing plate and the diaphragm to establish the air gap between the armature and the core and coil. In order to establish the air gap with the desired accuracy the following procedure is followed. The diaphragm 45 with the armature affixed thereto is bolted to the backing plate 46. The diaphrgam and backing plate are then laid in a horizontal position with the armature 47 facing upward. A circular disc of diameter just slightly smaller than the hole in the backing plate and of thickness equal to the required air gap is then laid on the armature, and the core and coil assembly is placed in position against the disc. The core and coil is centered with a suitable jig and is held in place by magnetic traction as previously explained. A plastic dielectric material is then cast around the core and coil assembly filling the aperture in the backing plate and is then allowed to harden. The diaphragm is then disassembled from the backing plate and the circular spacing disc removed. Upon reassembling the hydrophone an air gap of the desired magnitude will have been established with great accuracy.

A cylindrical casing 52 is bolted to the backing plate 46. A boss 53 is provided at the rear end of casing through which a cable 9 is led carrying the required electrical leads. A water proof packing gland is provided between the boss 53 and the cable 9 to insure that the electrical elements carried within the casing 52 are not damaged by moisture leaking through the cable.

The diaphragm contacting face of the backing plate 46 comprises two circular zones. A flat peripheral annular zone is provided which forms a sealing surface with the peripheral portion of the flat interior face of the diaphragm. Opposite the central vibrating portion of the diaphragm, a central zone 55 is provided, having an aperture at the center thereof. The surface of this central zone slopes relatively to the flat peripheral zone from all points on its circular outer perimeter toward the center thereof, thus forming a shallow concavity opposite the central vibrating portion of the diaphragm and presenting a convex backing plate surface to the diaphragm. The slope of the surface of the backing plate away from the surface of the diaphragm is predetermined relative to the thickness of the diaphragm and of such degree that, with increasing pressure on the exterior of the diaphragm, successive peripheral portions of the diaphragm of decreasing radius will be forced into contact with successive peripheral portions of decreasing radius of the sloping surface of this central zone. Thus with increasing pressure the effective vibrating area of the diaphragm will be decreased, thus increasing the stiffness of the diaphragm, consequently decreasing its sensitivity.

The characteristics of the sloping surface 55 will naturally depend, among other things, on the initial stiffness of the diaphragm. The initial stiffness of the diaphragm of course, will depend for the most part on its thickness. Therefore, in determining the required characteristics of the sloping surface 55 the thickness of the diaphragm must be taken into consideration. The slope of the surface 55 must be so correlated with the thickness of the diaphragm that the sensitivity of the diaphragm decreases at the desired rate in accordance with increasing pressure or intensity of sound energy impinging on the diaphragm. The slop of the surface 55 in each case must be determined empirically for each diaphragm of varying stiffness. The slope 55, of course, will also depend on the rate at which it is desired to decrease the sensitivity of the instrument. Each instrument will have a certain range which depends on the initial adjustment of the air gap between the armature and the face of the core and coil assembly and on the stiffness of the diaphragm. It is generally desirable to make the initial air gap between the armature and the core relatively small since the best characteristics for the instrument are obtained in this manner. With increasing pressure on the outer surface of the diaphragm, the armature is brought closer and closer to the face of the core and when the armature has approached too closely to the core, the instrument will not effectively operate until the pressure decreases and the armature recedes from the core. By means of the invention however the range of the instrument is greatly increased by decreasing the rate at which the armature approaches the face of the core in accordance with increased pressure on the diaphragm.

For the sake of a full understanding of the invention, an actual example of a hydrophone constructed in accordance with the invention will be described giving actual dimensions of the diaphragm and the dimensional characteristics of the sloping surface 55. In the example that follows the diaphragm has a diameter of 3.5 inches and a thickness of $\frac{1}{10}$ of an inch. The diameter of the concave central zone on the convex surface of the backing plate is likewise 3.5 inches. Referring now to Fig. 5 which graphically shows the characteristics of the portion O of the sloping surface on the backing plate, it will be noted that the downward slope of the surface increases from point A on the outer perimeter of the central zone 55 to point E on the perimeter of thet aperture 49. It is preferable to make the downward slope steeper toward the center, since as the diaphragm begins to move into contact with the sloping surface of the backing plate its stiffness increases very rapidly. In order to prevent the instrument from losing its sensitivity too quickly, the slope of the surface is made to drop away more rapidly toward the center of the diaphragm, as illustrated in Fig. 5. Points A through E are equally spaced .3125 inch apart. From point A to point B the slope drops below the line of the horizontal only .0006 of an inch. From B to C the sloping surface drops a total of .002 of an inch below the line of horizontal. From C to D the drop below the horizontal is a total of .004 of an inch, and from D to E the total drop is .008". A hydrophone constructed in accordance with the above example, and of the type shown in Fig. 4 has a very large operating range. While it is sensitive to pressures which are relatively small, in the order, for example, of 20 pounds per square inch, it will also effectively measure pressures of the order of 3,000 pounds per square inch. The tremendous pressures developed by an under-water explosion can be effectively detected on an instrument of this type.

Fig. 6 graphically illustrates the manner in which the hydrophone constructed in accordance with the above example will perform compared to the hydrophone shown in Figs. 1 to 3 which has similar dimensions but which is not provided with means for varying its sensitivity. As is well known, in a transducer of the variable inductance type, the inductance of the instrument depends on the size of the air gap between the armature and the core and coil assembly. As the armature approaches the poles of the core the reluctance of the magnetic circuit is decreased and therefore the inductance of the associated electric circuit is increased. However, the increase of inductance is not a linear function of the size of the air gap, but the rate of increase of inductance rises sharply as the armature moves closer to the poles of the core. In the graph of Fig. 6 the inductance of the hydrophone in millihenrys has been plotted against the pressure on the diaphragm, which of course controls the size of the air gap between the armature and the core. The dotted curve Y is a curve plotted for the hydrophone shown in Figs. 1 to 3, and the curve Z is the curve developed by the hydrophone shown in Fig. 4. It will be noted that in both cases the inductance of the hydrophone at zero pressure is 5 millihenrys. In the case of curve Y, the inductance of the hydrophone rises comparatively slowly at first but in the vicinity of pressures of 1,000 pounds per square inch the inductance of the hydrophone begins to rise very sharply until in the neighborhood of about 1,400 pounds per square inch the slope of curve Y approaches infinity. At this point the armature has closed the air gap and is now resting against the poles of the core. The hydrophone shown in Figs. 1 to 3 which is not provided with means for varying its sensitivity, is entirely unusable above pressures in the neighborhood of 1,400 pounds per square inch and is of little practical value for use in pressures of 1,000 to 1,400 pounds per square inch since the inductance is rising so rapidly it is difficult to accurately determine what pressure is indicated. Curve Z however, rises in the beginning at the same rate as curve Y but falls off gradually with increasing pressure in a manner generally similar to logarithmic function. As will be noted, the slope of curve Z is such that from zero to about 2,000 pounds per square inch, accurate measurements of the change of inductance may be made, while at about 2,500 pounds per square inch, the curve begins to flatten out and asymptotically approaches the horizontal. Nevertheless the slope is sufficient to obtain fairly accurate measurements at 3,000 pounds per square inch and above.

It will be apparent that the dimensions given above are merely by way of illustration, and that these dimensions will vary in accordance with the desired characteristics of the hydrophone. For example, where a thinner diaphragm is desired, normally the slope of the surface of the backing plate will be increased. Likewise, a change in the diameter of the diaphragm, or a change in the type of material in which the diaphragm is constructed will ordinarily call for different characteristics for the sloping surface of the backing plate. Obviously, the slope of the surface of the backing plate will depend on what sensitivity characteristics are desired for the hydrophone. Where rapid decrease in sensitivity is desired, the slope of the surface will be slight, so that the effective vibrating area of the diaphragm is rapidly decreased and its stiffness is correspondingly increased. Conversely, where a more gradual decrease of sensitivity is desired, the slope of the surface of the backing plate will be comparatively steeper.

It will be apparent that the above described method of reducing sensitivity of a transducer in accordance with increasing intensity of mechanical energy impinging thereon will be applicable to transducers of other types than that described above. Thus, and transducer for transducing mechanical energy which employs a diaphragm and an element which is responsive to deflections of the diaphragm may utilize the above described method. This method of varying the sensitivity of the transducer may be employed for example in transducers employing a pile of carbon granules, the resistance of which is varied in accordance with pressure exerted against the pile by the diaphrgam as it undergoes deflection. Likewise, the method described above for varying the sensitivity of a transducer may be applied to the condenser type transducer wherein the element responsive to deflections of the diaphgram is one plate on a condenser, the other plate being carried by the diaphragm, deflections of the diaphragm varying the air gap between the plates of the condenser.

The instruments which have been described above are especially designed for under-water use, but as pointed out, the invention is not limited to any particular use to which the transducer of the invention or any elements thereof may be put. The hydrophones particularly described above are admirably suited to measure static pressures or to measure very low frequency pressure variations in a fluid. However, the present invention is not limited to pressure measuring devices. By obvious minor modifications its general features can be applied to a wide variety of problems where a mechanical displacement may be converted into an electrical signal by means of a structure similar to the present hydrophone. Examples of instruments which might incorporate this invention are gravimeters, seismographs, ultramicrometers, electrostatic voltmeters, and the like.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for Governmental purposes without payment of any royalties thereon or therefor.

I claim:

1. A transducer comprising a housing; a rigid ring shaped backing plate secured to said housing, said plate having a central recessed portion defining a space therein and a peripheral portion with a flat outer surface, said central recessed portion having an aperture centrally disposed at one end of said backing plate and an irregular enlarged section extending inwardly from said aperture; a core and coil assembly centrally positioned in said enlarged section and having leads extending inwardly therefrom, a cast mass of dielectric material of a character providing dimensional stability of and partially surrounding said assembly and leads and filling said enlarged section, the irregularities of said enlarged section rigidly interlocking said mass of dielectric material to fixedly support said assembly within the confines of said enlarged section, said assembly comprising a substantially cylindrical core formed of discrete particles of magnetic material bonded to and insulated from each other by a dielectric material, said core having an annular cavity extending inwardly from the outer end surface thereof, and an annular coil positioned in said cavity flush with said end surface to form a planar face, said planar face abutting said aperture and being the only portion of said assembly not enveloped by said mass of dielectric; a diaphragm mounted on said plate; and a disc shaped armature secured to the inner face of said diaphragm and partially housed within said aperture in axial alignment with said assembly, said armature having a flat face substantially parallel to and spaced from said planar face, said armature being formed of discrete particles of magnetic material bonded to and insulated from each other by a dielectric material.

2. A transducer for transducing mechanical energy having a wide range of intensity comprising a circular diaphragm having a flat interior face, said interior face having a circular central vibrating portion and a nonvibrating peripheral portion circumferentially bounding said central vibrating portion, an armature secured to said interior face at the central portion thereof, a circular backing plate substantially coextensive with said diaphragm and having a diaphragm contacting face to which said diaphragm is secured, said diaphragm contacting face having a flat annular zone around the periphery thereof which lies supercoincidentally against the said peripheral portion of said diaphragm and rigidly affixed thereto, said diaphragm contacting face further having a circular central zone opposite the central vibrating portion of said diaphragm and an aperture in said backing plate at the center of said central zone adapted to receive said armature, an irregular enlarged cavity extending inwardly from said aperture and longitudinally through said backing plate, and a core and coil assembly disposed within the confines of said enlarged cavity in coaxial alignment with said aperture, said assembly having a face directly opposite said armature and spaced therefrom, and a plaster of paris cast filling said irregular enlarged cavity and so encasing said electromagnet as to leave said face exposed, the irregularities of said enlarged cavity rigidity interlocking said cast to fixedly mount said core and coil assembly within said enlarged cavity and retain said face in spaced parallel relation with said armature, the backing plate surface of said central zone being non-linear, the slope at the vertex of said non-linear surface being steeper than the slope at the outer periphery of said non-linear surface, all points along any one radius having the same slope and different radii having different slopes whereby concentric portions of said diaphragm of decreasing radius are forced into contact with the non-linear surface of said central zone in successive order thereby progressively decreasing the effective area and sensitivity of said diaphragm in response to increasing pressures thereon.

3. A device for transducing mechanical energy having a wide range of intensity comprising a pressure responsive diaphragm having a central vibrating portion, an armature mounted on said diaphragm at the central portion thereof, said armature comprising finely divided discrete particles of magnetic material bound together and insulated from one another by a mass of dielectric material, a backing plate having a diaphragm contacting face to which said diaphragm is affixed, said diaphragm contacting face of said backing plate having a central zone opposite said central vibrating portion of said diaphragm, said backing plate having a hollowed out section extending longitudinally therethrough and forming an aperture therein at the center of said central zone for receiving said armature, said hollowed out section having an enlarged portion extending rearwardly from said aperture, a core and coil assembly disposed in said enlarged portion in axial alignment with said aperture, said core and coil assembly having a face directly opposite said armature at a predetermined distance from said armature, and a mass of dimensionally stable dielectric material filling said enlarged portion and so encasing said core and coil assembly as to leave said face exposed for fixedly supporting said assembly within said backing plate and retaining said face at a predetermined distance from said armature, said mass of dielectric insulating said core and coil assembly from said backing plate to substantially eliminate eddy current effects thereof, said core and coil assembly comprising a disc-shaped core made up of finely divided discrete particles of magnetic material bound together and insulated from one another by a mass of dielectric material, said core having an annular cavity in said face, an annular coil positioned in said cavity, the diameter of said core and coil assembly being substantially the same as the diameter of said armature, the backing plate surface of said central zone sloping away from the surface of said diaphragm from all points on the outer periphery of said central zone toward the center thereof, the slope of said backing plate surface of said central zone having a line of curvature extending from the outer circular periphery of said central zone toward the center thereof such that the slope for points along said line of curvature progressively increases from a predetermined value at said outer periphery as the center of said central zone is approached, said line of curvature being predetermined relative to the thickness of said diaphragm and the increasing slope of the points along said line of curvature being of such a degree that, with increasing pressure on the exterior of said diaphragm, successive peripheral portions of said central vibrating portion of the diaphragm of decreasing radius are forced into contact with successive peripheral portions of decreasing radius of the backing plate surface of said central zone thus increasing the stiffness of said diaphragm and thereby decreasing its sensitivity.

4. A transducer for transducing mechanical energy having a wide range of intensity, comprising a circular diaphragm having a flat interior face, said flat interior face having a circular central vibrating portion and a nonvibrating peripheral portion circumferentially bounding said central vibrating portion, an armature affixed to said interior face at the central vibrating portion thereof, a cylindrical backing plate substantially coextensive with said diaphragm and having a diaphragm contacting face to which said diaphragm is affixed, said diaphragm contacting face having a flat annular zone around the periphery thereof which supercoincidentally abuts said peripheral portion of said diaphragm, said diaphragm contacting face further having a circular central zone opposite said central vibrating portion of said diaphragm, a cavity extending coxially through said backing plate and forming an aperture in said diaphragm contacting face at the center of said central zone for receiving said armature, said cavity having an enlarged section extending rearwardly from said aperture, an electromagnet disposed in said enlarged section in axial alignment with said aperture, said electromagnet having a planar face directly opposite said armature in spaced parallel relation thereto, and a plastic cast filling said enlarged section and so encasing said electromagnet as to leave said planar face exposed for fixedly mounting the electromagnet within said backing plate and retaining said planar face in spaced parallel relation with said armature, the backing plate surface of said central zone being of convex configuration and having a line of curvature extending from the outer circular periphery of said central zone toward the center thereof such that the slope for points along said line of curvature progressively increases from a predetermined value at said outer periphery as the center of said central zone is approached, said line of curvature being predetermined relative to the thickness of said diaphragm and the increasing slope of the points along said line of curvature being of such a degree that, with increasing pressure on the exterior face of said diaphragm, successive peripheral portions of said central vibrating portion of the diaphragm of decreasing radius are forced into contact with successive peripheral portions of decreasing radius of the convex surface of said central zone thereby progressively decreasing its sensitivity in response to increasing pressures thereon.

References Cited in the file of this patent

UNITED STATES PATENTS

| Number | Name | Date |
|---|---|---|
| 1,215,500 | Dodge | Feb. 13, 1917 |
| 1,355,254 | Parsons | Oct. 12, 1920 |
| 1,401,024 | Wood et al. | Dec. 20, 1921 |
| 1,471,547 | Chilowski | Oct. 23, 1923 |
| 1,563,626 | Hecht et al. | Dec. 1, 1925 |
| 1,573,739 | O'Neill | Feb. 16, 1926 |
| 1,590,369 | Hahnemann et al. | June 29, 1926 |
| 1,623,561 | Slepian et al. | Apr. 5, 1927 |
| 1,670,888 | Hahnemann | May 22, 1928 |
| 1,674,683 | Hahnemann | June 26, 1928 |
| 1,837,723 | McGraw | Dec. 22, 1931 |
| 1,976,874 | Brzeski | Oct. 16, 1934 |
| 2,015,674 | Hayes | Oct. 1, 1935 |
| 2,158,613 | Loughlin | May 16, 1939 |
| 2,391,038 | Rifenbergh | Dec. 18, 1945 |
| 2,410,805 | Black | Nov. 12, 1946 |
| 2,490,595 | Merten | Dec. 6, 1949 |

FOREIGN PATENTS

| Number | Country | Date |
|---|---|---|
| 403,006 | Italy | Apr. 1, 1943 |
| 457,348 | Germany | Nov. 13, 1926 |